US00RE46173E

(19) United States
(12) Reissued Patent
Jorge et al.

(10) Patent Number: US RE46,173 E
(45) Date of Reissued Patent: Oct. 4, 2016

(54) METHOD OF FUELING AN OIL LAMP

(71) Applicant: Ricardo J Jorge, Miami, FL (US)

(72) Inventors: Ricardo J Jorge, Miami, FL (US); Otto M Rodriguez, Miami, FL (US)

(73) Assignee: Ricardo J. Jorge, Miami, FL (US)

(21) Appl. No.: 14/740,366

(22) Filed: Jun. 16, 2015

Related U.S. Patent Documents

Reissue of:
(64) Patent No.: 8,678,045
Issued: Mar. 25, 2014
Appl. No.: 14/034,455
Filed: Sep. 23, 2013

(51) Int. Cl.
*B65B 1/04* (2006.01)
*F21V 37/00* (2006.01)
*B67D 3/00* (2006.01)
*F23Q 2/52* (2006.01)

(52) U.S. Cl.
CPC ..... *F21V 37/0012* (2013.01); *B67D 3/00* (2013.01); *F23Q 2/52* (2013.01)

(58) Field of Classification Search
CPC ..... F21V 37/0012; F23Q 2/52; B67D 3/00
USPC ..... 431/320, 321; 362/159; 220/495.06; 141/2, 18, 329, 363, 366
See application file for complete search history.

(56) References Cited

U.S. PATENT DOCUMENTS

| | | | | |
|---|---|---|---|---|
| 516,540 | A * | 3/1894 | Johnson | 141/369 |
| 4,281,692 | A * | 8/1981 | Caccamisi | 141/370 |
| 5,829,966 | A * | 11/1998 | Stoner | 431/320 |
| 5,881,692 | A * | 3/1999 | Lassanske | 220/495.06 |
| 6,010,333 | A * | 1/2000 | Tendick, Sr. | 431/324 |
| 6,579,090 | B1 * | 6/2003 | Taubitz et al. | 431/320 |
| 6,874,701 | B2 * | 4/2005 | Turberville | 239/129 |
| 2001/0016305 | A1 * | 8/2001 | Chen | 431/324 |

OTHER PUBLICATIONS

Patient Information: Port-A-Cath; Smiths Medical ASD, Inc.; 2009.

* cited by examiner

*Primary Examiner* — Sara Clarke
(74) *Attorney, Agent, or Firm* — David Kiewit

(57) ABSTRACT

Garden torches, hurricane lanterns and other oil lamps can be refueled through a flexible hose terminating in a tube or hollow needle insertable into the lamp's fuel reservoir through a wick slot. This method avoids skin contact with fuel and with soot deposited on the oil lamp reservoir.

2 Claims, 2 Drawing Sheets

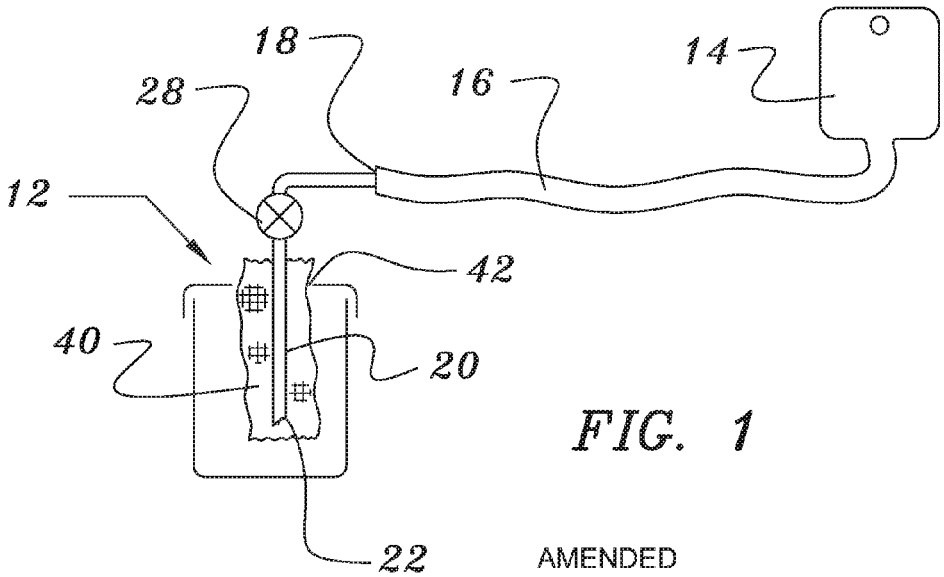
FIG. 1
AMENDED
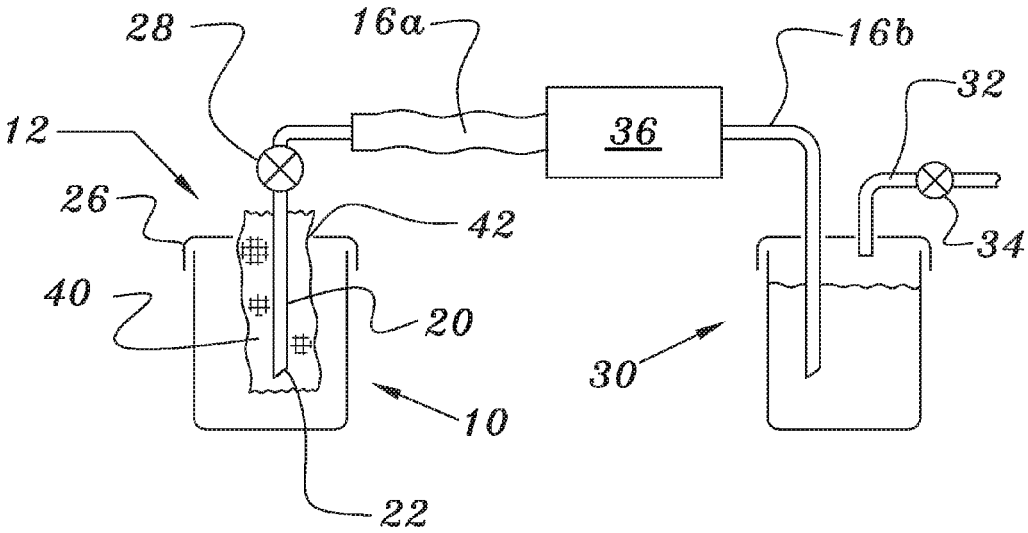
FIG. 2
AMENDED

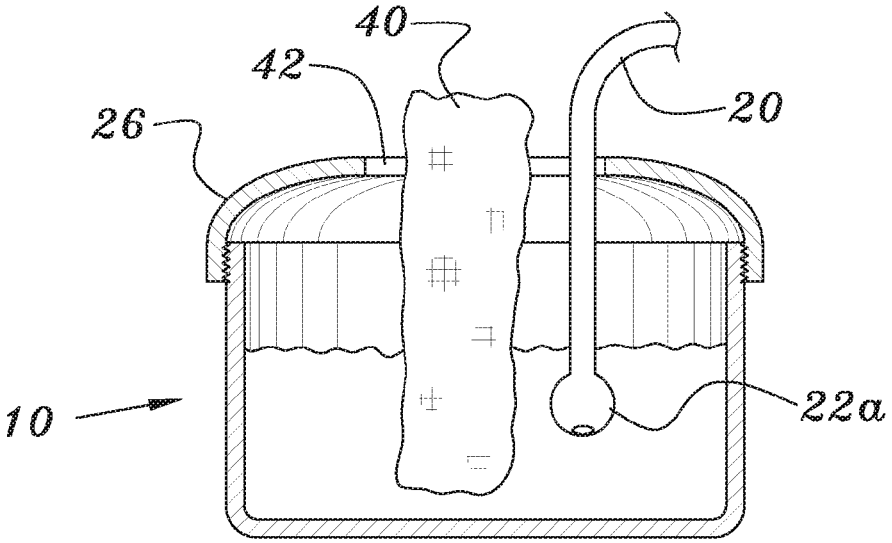
FIG. 3 AMENDED

METHOD OF FUELING AN OIL LAMP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The invention deals with garden torches and, more generally with oil lamps having a fibrous wick supported by a wick guide or support. The wick generally has a lower end in a liquid fuel container and an upper, free, end above the guide or support.

BACKGROUND INFORMATION

Oil lamps commonly use a fuel reservoir having a slotted top. A fibrous wick, which may be consumable (e.g., cotton) or non-consumable (e.g., fiberglass) extends from the reservoir upwardly through the slot. Common approaches to refueling an oil lamp may require removing the entire top of the reservoir, which may expose the person doing the refueling to a fuel-saturated wick as well as to residual soot on the wick or on the outside of the reservoir.

BRIEF SUMMARY OF THE INVENTION

One aspect of the invention is that it provides a method of adding fuel to a fuel reservoir of an oil lamp having a fibrous wick extending upwardly from an inside of the reservoir through a slot in a top of the reservoir. This method comprises connecting a flexible hose assembly between a supply vessel and an input end of a tube or hollow needle. The other, output end of the needle is then inserted through the slot into the reservoir and the fuel is urged to flow from the supply vessel through the flexible hose assembly into the fuel reservoir of the oil lamp.

It is an object of the invention to provide an approach to refueling an oil lamp that does not expose an operator's skin to contact with fuel or with soot that may be on the lamp.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 1 is a schematic depiction, not to scale, of a preferred apparatus for practicing the invention.

FIG. 2 is a schematic depiction, not to scale, of a second preferred apparatus for practicing the invention.

FIG. 3 is a cross-sectional detailed view of a fueling tube inserted in a fuel reservoir.

DETAILED DESCRIPTION OF A PREFERRED EMBODIMENT

Figure 4:
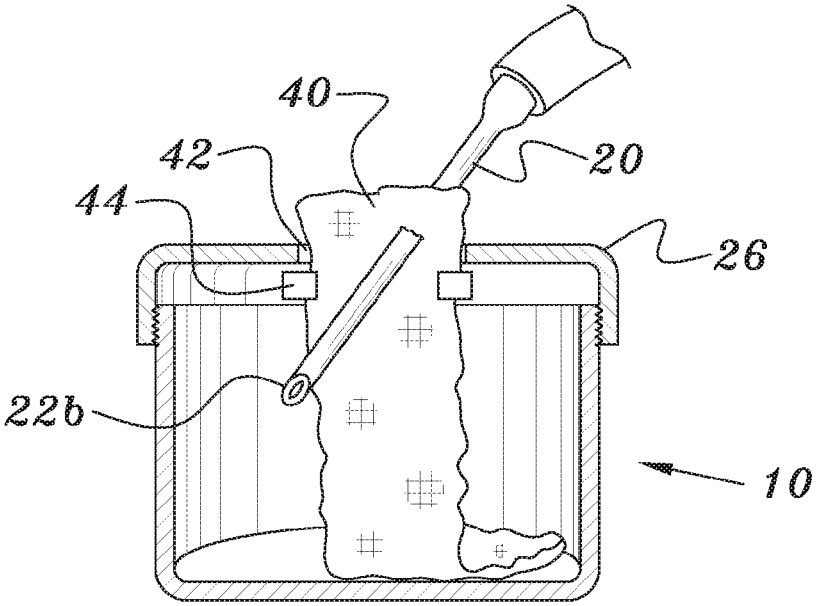
FIG. 4 is a cross-sectional detailed view of an alternate arrangement for inserting a fueling tube into a fuel reservoir.

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Turning now to FIG. 1, one finds a exemplar arrangement for adding fuel to a fuel reservoir 10 of an oil lamp 12. In this case the fuel is initially supplied in a flexible-walled bladder 14 connected by a flexible hose assembly 16 to an inlet end 18 of a narrow tube 20, generally referred to herein as a fueling tube or hollow needle, having an outlet end 22 inserted through a slot [24] *42* in a lid member 26 of the fuel reservoir 10.

In the arrangement shown in FIG. 1, an operator inserts the needle 20 through the slot [24] *42*, insures that the supply bladder 14 is higher than the fuel reservoir 10 and then opens a shut-off valve 28. Fuel is then urged through the hose by the force of gravity. When the fuel reservoir is full, the operator can shut off the flow of fuel and remove the needle from the reservoir.

Although the shut-off valve 28 is shown adjacent the input end of the needle in FIG. 1, the skilled reader will appreciate that this is a matter of choice and that the valve may be located anywhere along the hose assembly 16.

Another arrangement for refueling an oil lamp is shown in FIG. 2, where oil is pumped from a rigid-walled supply container 30 to the refueling needle. If the supply container is rigid a vent 32, preferably comprising a check valve 34, is supplied to allow air to enter the supply container as the fuel is withdrawn.

In the depiction of FIG. 2 the hose assembly 16 comprises two hose portions 16a, 16b. One of these is connected to an inlet of a pump 36 and the other to an outlet of the pump. The reader will recognize that in cases where a peristaltic pump is employed, the hose may pass through the pump body without being cut. Moreover, it will be recognized that many sorts of pumps, including, without limitation, both manually operated and electrically powered pumps may be used to urge the fuel from the supply container to the fuel reservoir.

It may be noted that pumped delivery may be used with the flexible bladder of FIG. 1 and that gravity-fed delivery may be carried out using the rigid-walled fuel container of FIG. 2.

Turning now to FIG. 3 and FIG. 4, one finds detailed depictions of a refueling needle protruding through a slot in a top member of a fuel reservoir. In a preferred arrangement, shown in FIG. 3, an appreciable free space exists between an edge of the wick 40 and the end of the wick slot 42. In this case the feed tube or needle is inserted through the slot alongside the wick 40 and a smooth or expanded outlet end 22a may be provided on the fueling tube 20 in order to prevent it from snagging on the wick 40. In other cases, where the wick and wick guide take up almost the entire slot, the needle may be inserted through the wick as shown in FIG. 4. In this case a narrow diameter, sharp outlet end 22b may be preferred to minimize damage to the wick.

The fueling needle may be a metal tube or may be formed of a suitable plastic and may have a wide variety of lengths. The outer diameter of the needle is selected to be small enough to fit through the slot formed in the top of the oil lamp and, if wick-feeding or support elements 44 are present, is preferably small enough to fit between the wick-feeding or support elements and a wall of the slot.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

[1. A method of adding fuel to a fuel reservoir of an oil lamp having a fibrous wick extending upwardly from an inside of the reservoir through a slot in a top of the reservoir, the method comprising the steps of:

providing a supply vessel holding a supply of the fuel;

providing a flexible hose assembly having two ends, a first end of the flexible hose assembly connected to the supply vessel, the second end of the flexible hose assembly attached to an inlet end of a fueling tube;

inserting an outlet end of the fueling tube through the slot into the reservoir; and urging the fuel to flow from the supply vessel, through the flexible hose assembly and into the fuel reservoir.]

[2. The method of claim 1 wherein the supply vessel comprises a flexible bladder.]

[3. The method of claim 1 wherein the supply vessel comprises a rigid container having a vent allowing air to enter the rigid container as fuel is withdrawn.]

[4. The method of claim 1 wherein the supply vessel is held above the oil lamp so that the fuel is urged from the supply vessel to the fuel reservoir by the force of gravity.]

[5. The method of claim 1 further comprising providing a pump to urge the fuel from the supply vessel to the fuel reservoir.]

6. [The] *A* method of [claim 1 wherein] *adding fuel to a fuel reservoir of an oil lamp having a fibrous wick extending upwardly from an inside of the reservoir through a slot in a top of the reservoir, the method comprising the steps of:*

*providing a supply vessel holding a supply of the fuel;*

*providing a fueling tube having inlet and outlet ends, the inlet end of the fueling tube connected to the supply vessel;*

*inserting* the outlet end of the fueling tube [is inserted] between the wick and a fixed portion of the top of the reservoir*; and*

*urging the fuel to flow from the supply vessel, through the fueling tube and into the fuel reservoir.*

7. [The] *A* method of [claim 1 wherein] *adding fuel to a fuel reservoir of an oil lamp having a fibrous wick extending upwardly from an inside of the reservoir through a slot in a top of the reservoir, the method comprising the steps of:*

*providing a supply vessel holding a supply of the fuel;*

*providing a fueling tube having inlet and outlet ends, the inlet end of the fueling tube connected to the supply vessel;*

*inserting the outlet end of the fueling tube through the slot into the reservoir so that* the outlet end of the fueling tube is inserted through the wick*; and*

*urging the fuel to flow from the supply vessel, through the fueling tube and into the fuel reservoir.*

[8. The method of claim 1 wherein the hose assembly consists of a single flexible hose.]

[9. The method of claim 1 wherein the fueling tube comprises a shutoff valve adjacent the inlet end thereof.]

* * * * *